United States Patent [19]

McElroy, Jr.

[11] 4,402,306
[45] Sep. 6, 1983

[54] THERMAL ENERGY STORAGE METHODS AND PROCESSES

[76] Inventor: Robert C. McElroy, Jr., 5600 N. 26th St., Arlington, Va. 22207

[21] Appl. No.: 360,659

[22] Filed: Mar. 22, 1982

Related U.S. Application Data

[63] Continuation-in-part of Ser. No. 134,501, Mar. 27, 1980, abandoned.

[51] Int. Cl.$^3$ .............................................. F24J 3/02
[52] U.S. Cl. ..................... 126/436; 126/437; 126/439
[58] Field of Search ............... 126/400, 430, 436, 437, 126/438, 439, 440, 417, 900

[56] References Cited

U.S. PATENT DOCUMENTS

| | | | |
|---|---|---|---|
| Re. 25,242 | 9/1962 | Toulmin | 126/439 |
| 2,388,940 | 11/1945 | Taylor | 126/437 |
| 3,955,554 | 5/1976 | Collie | 126/437 |
| 3,988,166 | 10/1976 | Beam | 126/439 |
| 4,068,474 | 1/1978 | Dimitroff | 126/439 |
| 4,088,266 | 5/1978 | Keyes | 126/436 |
| 4,116,223 | 9/1978 | Vasilantone | 126/440 |
| 4,131,485 | 12/1978 | Meinel | 126/439 |
| 4,188,941 | 2/1980 | Hopkins | 126/440 |
| 4,233,961 | 11/1980 | Kelly | 126/436 |
| 4,239,638 | 12/1980 | Beretta | 126/900 |
| 4,280,480 | 7/1981 | Raposo | 126/436 |
| 4,286,581 | 9/1981 | Atkinson | 126/437 |
| 4,326,501 | 4/1982 | Jardin | 126/436 |
| 4,343,295 | 8/1982 | Dubicki | 126/437 |
| 4,365,615 | 12/1982 | Melvin | 126/437 |

*Primary Examiner*—Daniel J. O'Connor
*Attorney, Agent, or Firm*—Shlesinger, Arkwright, Garvey & Fado

[57] ABSTRACT

A thermal energy collecting and storing device including a thermally insulated storage vessel including a heat retaining material holding chamber, a solar portal in the top of the vessel, the solar portal including a tubular member having upper and lower portions extending from the top of the vessel into the heat retaining material holding chamber and spaced from the side walls of the vessel and wherein the spacing between the side walls and the tubular member forms a second peripheral chamber about the solar portal. Substantially filling the holding chamber as well as a portion of the second peripheral chamber is a material having a low melting point and good heat retaining capacity. The peripheral chamber includes an expansion area above the heat retaining material so that the material is allowed to expand when heated. Means are provided for closing the lower portion of the tubular member and for transmitting energy to the heat retaining material. A transparent sheet is situated across the upper surface of the solar portal for closing the upper portion of the tubular member. The transparent sheet and the means for closing the lower portion of the tubular member are spaced from each other and form a third chamber which insulates the holding chamber from the outside environment. A solar concentrator is positioned above the solar portal for directing concentrated solar rays through the solar portal and on to the means for transmitting energy to the heat retaining material.

4 Claims, 2 Drawing Figures

U.S. Patent  Sep. 6, 1983  4,402,306
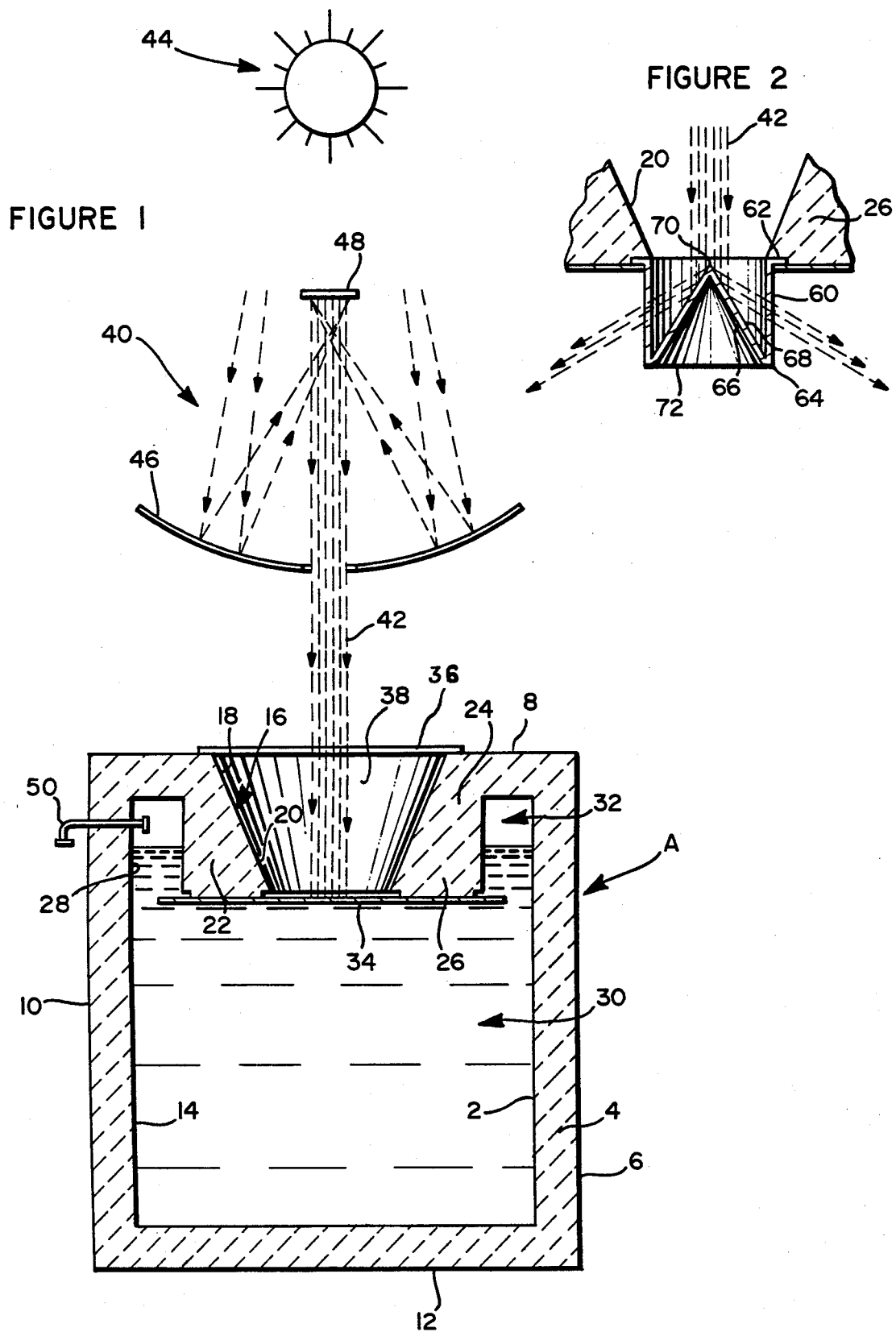

4,402,306

THERMAL ENERGY STORAGE METHODS AND PROCESSES

FIELD OF INVENTION

This application is a continuation-in-part of application Ser. No. 134,501 filed Mar. 27, 1980, now abandoned.

This invention pertains to solar energy storage devices and more particularly to solar energy storage devices wherein concentrated solar energy is utilized in order to heat a material having good heat absorbing and heat retaining capacity and wherein the heat absorbing material is contained in a thermally insulated storage vessel of improved construction.

HISTORICAL BACKGROUND

With the increasing cost of conventional fuels such as oil and natural gas, strong emphasis has been placed upon research involving the use of solar energy as an alternative energy source. Solar energy has proven to be a viable alternative to the more common energy sources presently in widespread use. The major criticisms concerning the use of solar energy revolve around two major aspects, namely, the cost involved in manufacturing solar energy heating devices as well as the efficiency of those devices. For those reasons, widespread use of solar heating apparatus has up to the present time been thwarted.

SUMMARY AND OBJECTS OF THE INVENTION

This invention provides a device for effectively utilizing solar energy in order to transfer radiant heat to a medium possessing good heat absorbing capacity as well as a specially designed thermally insulated storage vessel for the heat absorbing medium.

The invention encompasses two embodiments, the first of which utilizes an indirect method for heating the heat absorbing medium and the second utilizing means for directly heating the heat absorbing medium.

It is therefore an object of the present invention to provide a solar energy collecting and storing device having improved efficiency.

It is a further object of the present invention to provide a solar energy storage device which minimizes thermal losses.

It is another object of the present invention to provide a solar energy collecting and storing device which is inexpensive to manufacture.

It is a further object of the present invention to provide a solar energy collecting and storing device which utilizes either direct or indirect heating methods.

A still further object of the present invention is to provide a solar energy collecting and heating device which is of rugged construction.

A still further object of the present invention is to provide a solar energy collecting and heating device having domestic as well as commercial, industrial and agricultural application.

The foregoing and other objects and advantages of this invention will appear from the following detailed description, taken in connection with the accompanying drawings in which:

FIG. 1 is a cross-sectional view of the storage vessel with the solar energy system and sun shown diagramatically.

FIG. 2 is a fragmentary enlarged perspective view in cross-section with the solar energy system and sun shown diagramatically.

DETAILED DESCRIPTION OF THE DRAWINGS

Referring now to FIG. 1, the solar energy collecting and storing device consists of a storage vessel designated by the letter A and including an inner shell 2, an intermediate insulation layer 4, and an exterior shell 6 surrounding intermediate insulation layer 4. Inner shell 2 may be constructed of steel, concrete, sheet metal, reinforced glass fiber or other suitable material. Intermediate insulation layer 4 is preferably made of ceramic fiber insulation. Exterior shell 6 may be constructed of reinforced glass fiber, sheet metal, aluminum or concrete.

Storage vessel A includes top wall 8, side walls 10 and bottom wall 12. A heat retaining material holding chamber 14 is defined by walls 8, 10 and 12.

A solar portal 16 having upper surface 18 and lower surface 20 is formed in top wall 8 of vessel A. Solar portal 16 includes a tubular member 22 having upper portion 24 and lower portion 26. Tubular member 22 extends from top wall 8 into heat retaining material holding chamber 14 and is spaced from side walls 10. The spacing between side walls 10 and tubular member 22 forms a second peripheral chamber 28 about solar portal 16.

Within holding chamber 14 is a material 30 having a relatively low melting point as well as a good heat retaining capacity. This material is preferably paraffin, however other suitable materials may be used in place thereof. Material 30 substantially fills holding chamber 14 as well as a portion of second peripheral chamber 28 so that it ultimately surrounds lower portion 26 of tubular member 22. Second peripheral chamber 28 includes an expansion area 32 above material 30 so as to permit material 30 to expand when heated. Possible anaerobic bacterial growth will be eliminated by the use of residual pesticide.

A sheet or plate of material 34 is associated with lower surface 20 of solar portal 16 in order to close lower portion 26 of tubular member 22 and for transmitting energy to material 30. Sheet 34 may be metallic or ceramic in nature. A sheet of transparent material 36 is associated with upper surface 18 of solar portal 16 in order to close upper portion 24 of tubular member 22.

Transparent sheet 36 and heat transmitting sheet 34 are spaced a distance from each other so that a third chamber 38 is formed therebetween. Third chamber 38 provides for additional insulation of holding chamber 14 from the environment outside of vessel A.

A solar concentrator 40 is positioned above solar portal 16 in order to direct concentrated solar rays 42 from sun 44 through transparent sheet 36 and solar portal 16 and on to energy transmitting sheet 34. Solar concentrator 40 is shown to include a parabolic dish 46 and a secondary reflector 48.

Leading into expansion area 32 of second peripheral chamber 28 is a pressure relief valve 50. An inert gas such as nitrogen or carbon dioxide may be added to expansion area 32 in order to eliminate chemical changes caused by oxidation of the heat storage liquid 30 within vessel A.

Third chamber 38 is shown as being frusto conical in shape.

In the embodiment shown in FIG. 2, a generally cylindrical shaped transparent glass insert 60 is positioned by means of flange 62 within lower surface 20 of solar portal 16 in order to close lower portion 26 of tubular member 22. Glass insert 60 extends into heat retaining material 30 of holding chamber 14. Glass insert 60 includes a base edge 64 which is positioned below the surface of heat retaining material 30. A conical shaped member 66 having a mirrored exterior surface 68 is positioned within glass insert 60. Conical shaped member 66 includes an apex 70 which points in the direction of solar concentrator 40. Conical shaped member 66 including apex 70 should be positioned below the surface of heat retaining material 30. Conical shaped member 66 also includes a base edge 72 which is integrally formed with base edge 64 of glass insert 60.

OPERATION

Again referring to FIG. 1, this form of the invention provides means for indirectly heating heat retaining material 30. Concentrated solar rays 42 emerging from solar concentrator 40 pass through transparent sheet 36 and strike the upper surface of plate 34. Since the lower surface of sheet 34 is in direct contact with heat retaining material 30, energy in the form of heat is transferred through sheet 34 and into material 30. In order to minimize thermal loss, storage vessel A is entirely insulated. As material 30 is heated, it is allowed to expand into second peripheral chamber 28 and expansion area 32. If subsequent space for expansion is necessary, material 30 may exit from the interior of vessel A through a pressure relief valve 50 and into an exteriorly positioned secondary expansion vessel (not shown).

With a relatively high specific heat and a wide stable temperature range, paraffin is an ideal liquid medium in which to store the thermal energy.

In the embodiment shown in FIG. 2, direct heating of material 30 is provided for. Concentrated solar rays 42 emerging from solar concentrator 40 pass through transparent sheet 36 and through solar portal 16 and strike the surface of conical shaped member 66 which is positioned within the interior of glass insert 60. Since the exterior surface of conical shaped member 66 is mirrored as shown at 68, incoming concentrated solar rays 42 are reflected from surface 68 through the side walls of insert 60 and subsequently into heat retaining material 30. The direct heating method of FIG. 2 is somewhat more efficient than the indirect heating method of FIG. 1.

Thus, the energy collecting and storing device of this invention is capable of storing vast amounts of energy whenever solar power is available.

An alternative embodiment of the invention which is not shown would utilize a holographic lens system in conjunction with the apparatus previously described.

The thermal energy collecting and storing device described above has application in domestic heating and cooling systems as well as in commercial, industrial and agricultural processes. The potential usefulness of this system is enhanced due to its ability to produce steam. Production of steam will allow solar power to be readily adapted to existing commercial and industrial machinery and processes.

While this invention has been described as having a preferred design, it will be understood that it is capable of further modification. This application, is therefore intended to cover any variations, uses, or adaptations of the invention following the general principles thereof including such departures from the present disclosure as come within known or customary practice in the art to which this invention pertains, and as may be applied to the essential features hereinbefore set forth and fall within the scope of this invention or the limits of the claims.

I claim:

1. A thermal energy collecting and storing device including:
   (a) a thermally insulated storage vessel having top, bottom and side walls forming a heat retaining materia' holding chamber,
   (b) a solar portal having upper and lower surfaces within said top wall,
   (c) said solar portal including a tubular member having an upper and lower portion extending from said top wall of said vessel into said heat retaining material holding chamber and spaced from said side walls of said vessel,
   (d) said spacing between said side walls and said tubular member forming a second peripheral chamber about said solar portal,
   (e) a material having good heat retaining capacity and a relatively low melting point and substantially filling said holding chamber and a portion of said second peripheral chamber and surrounding said lower portion of said tubular member,
   (f) said peripheral chamber including an expansion area above said heat retaining material to permit said material to expand when heated,
   (g) means associated with said lower surface of said solar portal for closing said lower portions of said tubular member and for transmitting energy to said heat retaining material,
   (h) a transparent sheet associated with said upper surface of said solar portal for closing said upper portion of said tubular member,
   (i) said transparent sheet and said means associated with said lower surface being spaced from each other and forming a third chamber for insulating said holding chamber from the outside of said storage vessel, and
   (j) a solar concentrator positioned above said solar portal for directing concentrated solar rays through said solar portal and onto said means for transmitting energy.

2. A thermal energy collecting and storing device as in Claim 1 and wherein;
   (a) said third chamber being frusto conical in shape.

3. A thermal energy collecting and storing device as in claim 1 and wherein;
   (a) said means associated with said lower surface of said solar portal for closing said lower portion of said tubular member and for transmitting energy to said heat retaining material including a sheet of heat absorbing and heat conducting material having a top surface and a bottom surface,
   (b) said bottom surface being in contact with said heat retaining material, and
   (c) said top surface being exposed to said concentrated solar rays.

4. A thermal energy collecting and storing device as in claim 1 and wherein;
   (a) said means associated with said lower surface of said solar portal for closing said lower portion of said tubular member and for transmitting energy to said heat retaining material including a generally cylindrical shaped transparent glass insert positioned within said lower portion of said tubular member and extending downwardly into said heat retaining material.
(b) said glass insert having a base edge positioned below the surface of said heat retaining material,
(c) a conical shaped member having a mirrored exterior surface positioned within said glass insert,
(d) said conical shaped member including an apex pointing in the direction of said solar concentrator,
(e) said apex located below the surface of said heat retaining material, and
(f) said conical shaped member including a base edge integrally formed with said base edge of said glass insert.

* * * * *